Nov. 6, 1962 W. H. FRITZ ETAL 3,062,986

VOLTAGE OUTPUT CONTROL MEANS

Filed Aug. 24, 1959 6 Sheets-Sheet 1

INVENTORS
WILLIAM H. FRITZ
NORMAN M. POTTER
CLAIR W. REASH
BY John F. Hohmann
ATTORNEY Nov. 6, 1962 W. H. FRITZ ETAL 3,062,986

VOLTAGE OUTPUT CONTROL MEANS

Filed Aug. 24, 1959 6 Sheets-Sheet 2

INVENTORS
WILLIAM H. FRITZ
NORMAN M. POTTER
CLAIR W. REASH

BY John F. Hohmann
ATTORNEY

INVENTORS
WILLIAM H. FRITZ
NORMAN M. POTTER
CLAIR W. REASH
BY John F. Hehmann
ATTORNEY

VOLTAGE OUTPUT CONTROL MEANS

Filed Aug. 24, 1959 6 Sheets-Sheet 4

INVENTORS
WILLIAM. H. FRITZ
NORMAN M. POTTER
CLAIR W. REASH

BY John F. Hohmann

ATTORNEY

Fig. 12.
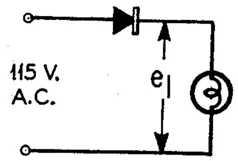
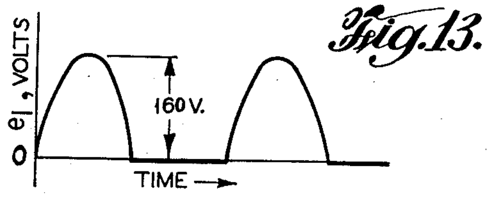
Fig. 13.
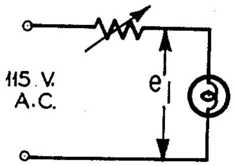
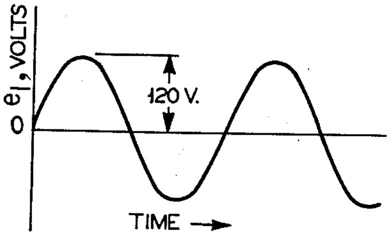
Fig. 14.
Fig. 15.
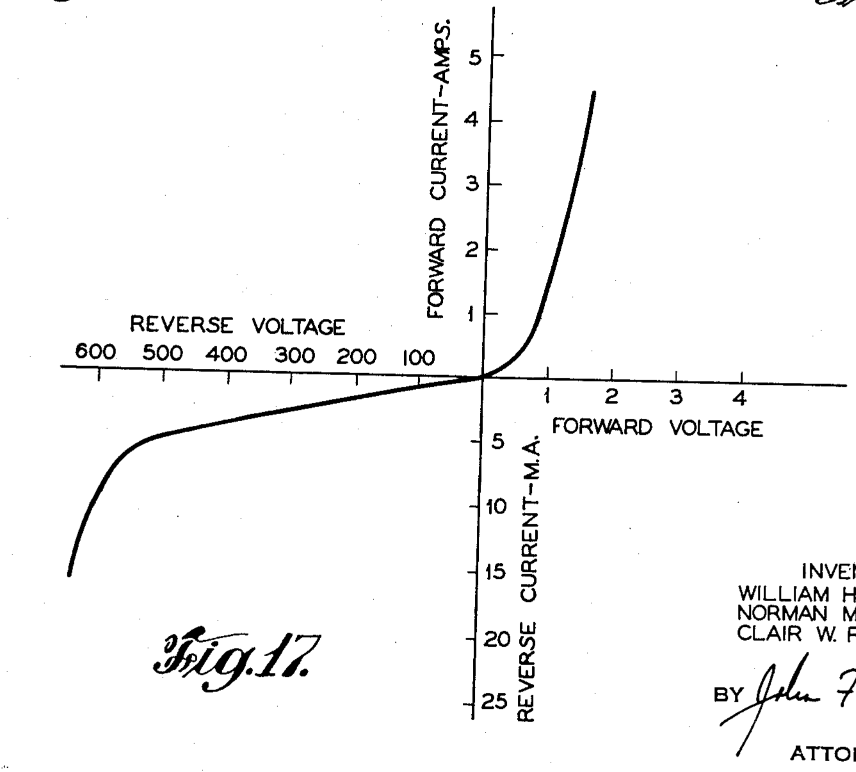
Fig. 17.
INVENTORS
WILLIAM H. FRITZ
NORMAN M. POTTER
CLAIR W. REASH
BY John F. Hohmann
ATTORNEY INVENTORS
WILLIAM H. FRITZ
NORMAN M. POTTER
CLAIR W. REASH
BY John F. Hohmann
ATTORNEY United States Patent Office 3,062,986
Patented Nov. 6, 1962

3,062,986

VOLTAGE OUTPUT CONTROL MEANS

William H. Fritz, Bay Village, Norman M. Potter, Rocky River, and Clair W. Reash, Fairview Park, Ohio, assignors to Union Carbide Corporation, a corporation of New York Filed Aug. 24, 1959, Ser. No. 835,727
6 Claims. (Cl. 315—200)

This invention relates to means for selectively controlling the effective alternating current voltage supplied to heat-producing devices which are insensitive to wave form. More specifically, the invention is concerned with an electric light of selectively variable intensity.

Conventionally, the dimming of incandescent filament lights, such as photographic studio lights, is effected by the use of voltage dropping resistors, at the cost of high losses, or by using two identical lamps, connecting them in series for dimming and in parallel for full intensity. The main disadvantage of the last mentioned technique is the low light output level, on the order of 8 percent of the full rated value, which occurs during dimming when the lamp voltage is reduced to 50 percent of its normal value. This light value is too low for critical camera focusing, and makes it difficult to estimate the exact lighting effect possible under full illumination. For most home appliances, dimming is accomplished by the use of a dual-filament lamp arrangement, or by the use of separate high and low wattage lamps.

The main object of this invention, therefore, is to provide a dimming device free from the previously enumerated disadvantages of prior art expedients.

An equally important object of the instant invention is to provide efficient means for controlling the effective alternating current voltage supplied to devices which are insensitive to the voltage wave form.

Another object of the invention is to provide an electric light of variable intensity which allows the use of an ordinary lamp bulb, and which will prolong the useful life of the lamp bulb.

Another object of the invention is to provide a rectifier dimmer of a size which will permit its installation in any three-way lamp socket.

In the drawings:

FIG. 12 is a diagram of a circuit containing a lamp and the instant device;

FIG. 13 is a curve showing the wave form of the voltage obtained with the present device;

FIGS. 14 and 15 are the same, respectively, for a prior art dropping resistor arrangement;

FIG. 17 is a curve showing typical rectifying characteristics for the rectifiers used in the practice of the invention.

Figure 1:
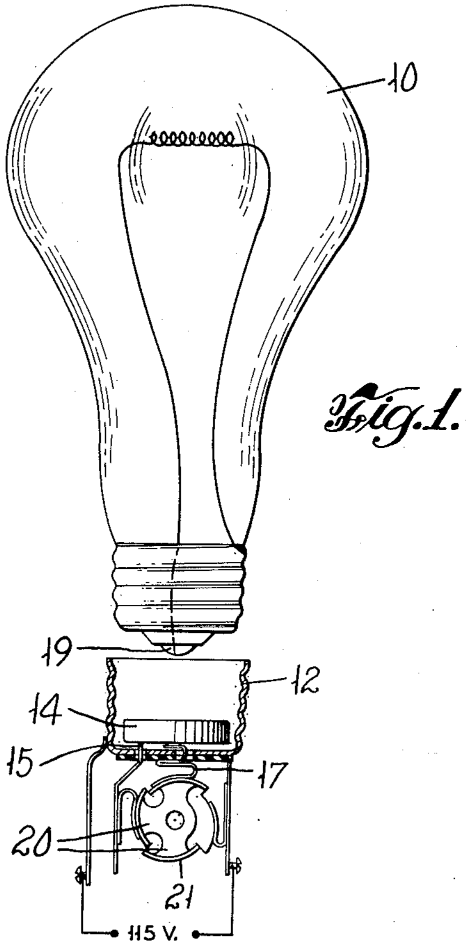
FIG. 1 is a schematic view of a dimmer in accordance with the invention, and shown associated with a lamp and a lamp socket.
Figure 1A:
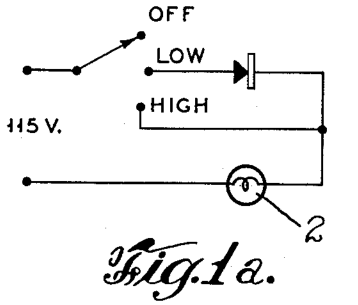
FIG. 1A is a schematic view of a typical circuit.

Broadly construed, the inventive concept underlying the instant invention and illustrated in FIG. 1A consists in providing two prossible paths leading from a source of alternating current to a given device 2, which is insensitive to voltage wave form, and including in series with one of the paths a diode rectifier. Depending upon which of the two possible paths the current is made to follow, either full or reduced performance will be obtained from the device without significant loss of power therefrom.

Referring niw to FIG. 1, there is shown an ordinary single filament bulb 10 adapted for mounting in a standard three-way household Leviton lamp socket 12, which is of conventional design except for the presence therein therein of a thin disc-shaped adapter 14, containing a silicon diode rectifier assembly, which rests on pin extension 15 and contact spring 17. FIG. 1 shows the arrangement of the lamp filament and the base contact 19 of bulb 10 in relation to the contacts of the ordinary four position rotary switch-containing lamp socket. The electrical paths controlled by the three remaining switch positions can be more easily understood by tracing through the schematic circuit diagram shown on FIGS. 2, 2A and 2B.

Figure 2:
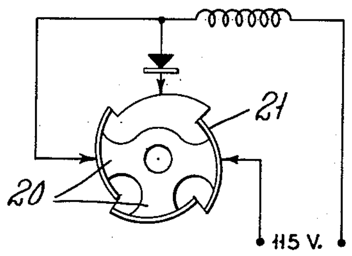
FIGS. 2 through 2B are sectional views of a switch associated with the dimmer of the invention shown in various operating positions.
Figure 2A:
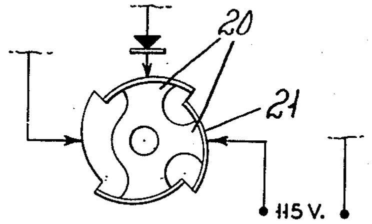
Figure 2B:
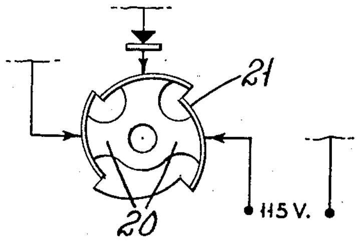

In FIG. 1 the points 20 of Leviton switch 21 correspond to the off position; in FIG. 2 they correspond to bright illumination, since the current bypasses the diode rectifier; in FIG. 2A dim illumination is obtained for the current must pass through the rectifier. Bright illumination is again secured by turning the switch to the position of FIG. 2B, since the rectifier is bypassed.

Figure 3:
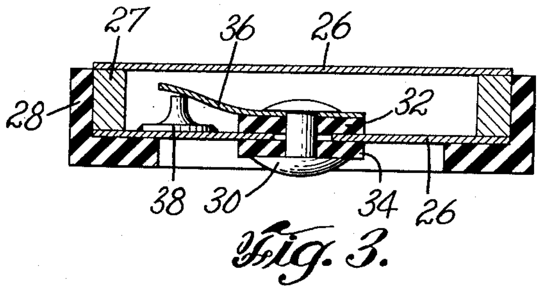
FIGS. 3, 4 and 5 are vertical sectional views of various embodiments of rectifier dimmers.

FIG. 3 shows an embodiment of the dimmer adapter of the invention. The adapter there shown consists of a round metal shell 26, supported by a cut-out cylindrical disc 28 of insulating material. Passing through the bottom of shell 26 is a rivet 30, insulated therefrom by suitable plastic or rubber insulating members 32 and 34. A metal contact spring 36 is electrically connected at one end thereof to rivet 30. The other end of contact spring 36 is also electrically connected by suitable means such as soldering to silicon diode 38, which is in electrical contact with the top of shell 26 through the circular side wall 27.

Figure 4:
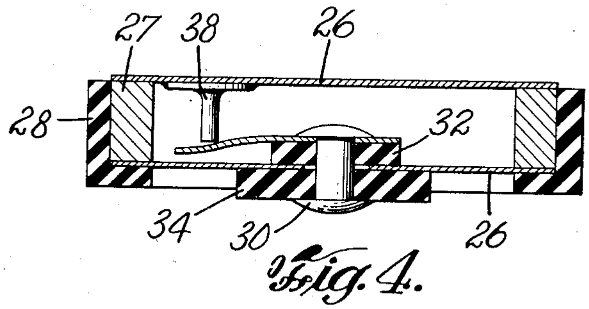
Figure 7:
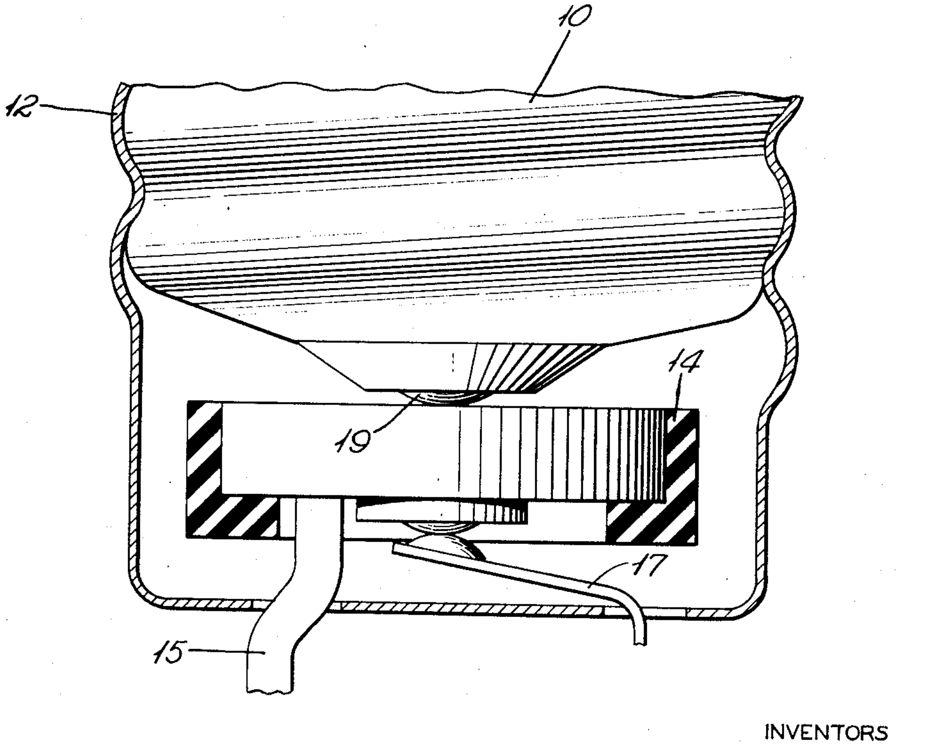
FIGS. 7, 8, 9, 10 and 11 are fragmentary views, partly broken away, showing lamp height relationship when dimmers of the invention are inserted in lamp sockets.

The embodiments shows on FIGS. 3 and 4 are alike except for the internal positioning of the diode rectifier. It will be noted that in FIG. 3 diode 38 lies on the same plane as rivet 30, while in FIG. 4 diode 38 lies on a plane above that of rivet 30 with its base electrically secured to the top of shell 26 by suitable conductive means such as soldering. These embodiments of the dimmer adapter are shown in a standard lamp socket on FIG 7.

Figure 5:
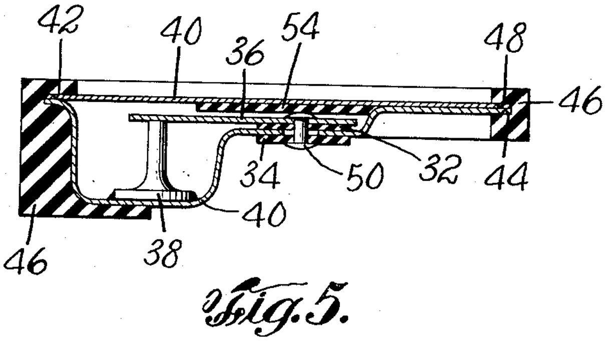
Figure 6:
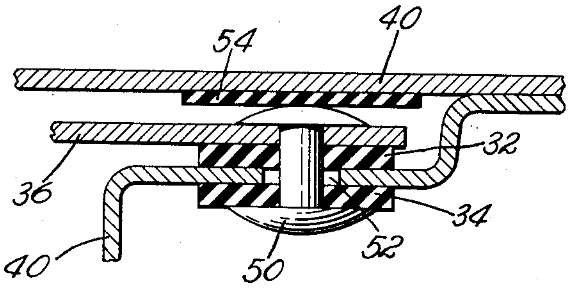
FIG. 6 is an enlarged sectional view showing assembly details of the preferred embodiment of the rectifier dimmer.
Figure 8:
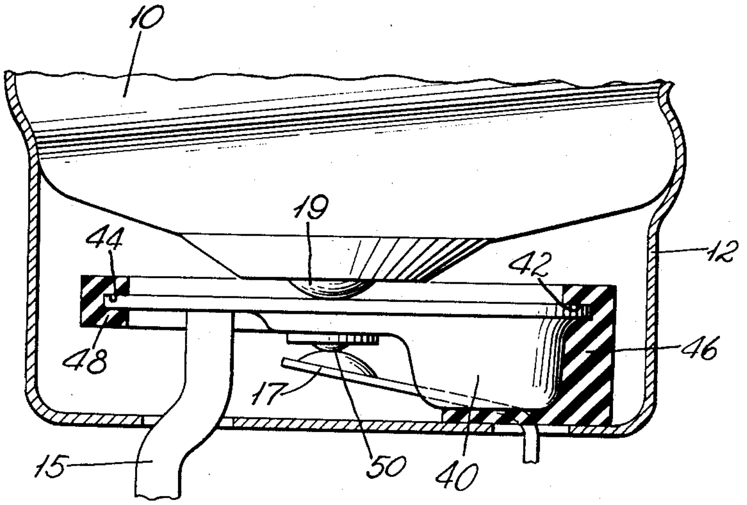
Figure 11:
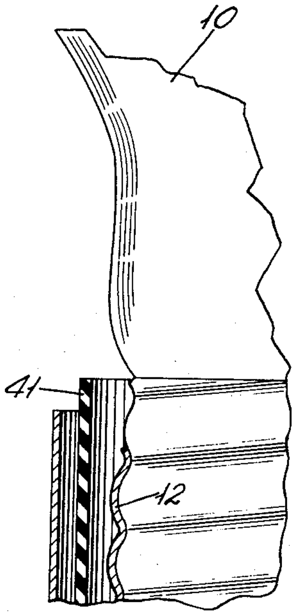

FIG. 5 illustrates the most compact, and hence the preferred embodiment of a dimmer adapter. Using this embodiment with a light bulb as shown on FIG. 8, the base of the bulb does not protrude above the insulating sleeve 41 of the socket as shown in FIG. 11. As shown on FIG. 5, this embodiment consists of an L-sectioned circular metallic shell 40 formed from two sheets of metal secured together at their respective peripheries, and supported in circular recess 42 and 42—48 provided by an L-sectioned circular insulating member 46, suitably fabricated from heat-resistant rubber or plastic. As shown in greater detail in FIG. 6, the lower metallic sheet is provided with one opening 52 of a larger diameter than that of rivet 50, so as to provide means for preventing electrical contact between the rivet 50 and the lower section of metallic shell 40. As can be appreciated more readily by referring to FIG. 6, electrical contact between the rivet 50 and the housing or shell 40 is further prevented by means of plastic or rubber insulator 54.

Figure 9:
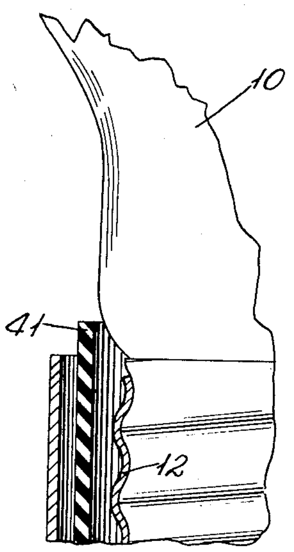

FIG. 9 shows lamp height in a standard socket 12. As indicated, the insulating sleeve 41 protrudes above the level of the lamp base.

Figure 10:
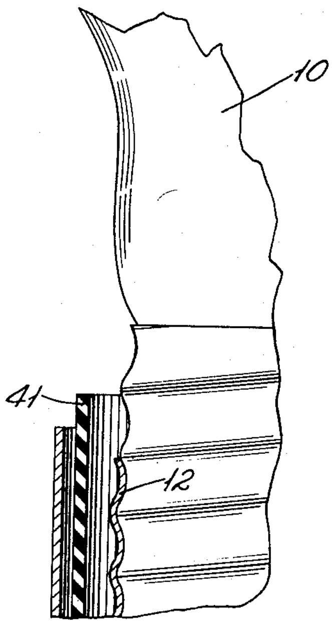

With the embodiments of the dimmer adapter shown on FIGS. 3 and 4, in a socket of the same dimensions as shown on FIG. 9, the position of the lamp base is as indicated on FIG. 10, while FIG. 11 shows the lamp height relationship with the preferred dimmer of the invention. It should be noted that in this instance the insulating sleeve 41 is even with the upper rim of the lamp base, and perfectly suitable for all applications.

The circuit shown on FIG. 12 consists of a silicon rectifying junction in series with a RFL 2A photoflood lamp. FIG. 13 shows the waveform of the voltage across this lamp. With an RFL 2A photoflood lamp and a high efficiency silicon junction rectifier connected in series, the light output was 31.8 percent of that when the lamp was operated at 115 volts. The peak current through the lamp was 6.5 amperes, which for a sine wave yields effective current of 3.25 amperes and an average value of 2.06 amperes.

The rated power consumption of the RFL 2A photoflood lamp is 500 watts. The power dissipated by the lamp with a series rectifier was observed to be 260 watts, or 52 percent of the rated value. If the lamp filament had a zero temperature coefficient of resistance and a perfect rectifier were used, the power dissipated in the load would be 50 percent of that with full line voltage across the lamp.

Figure 16:
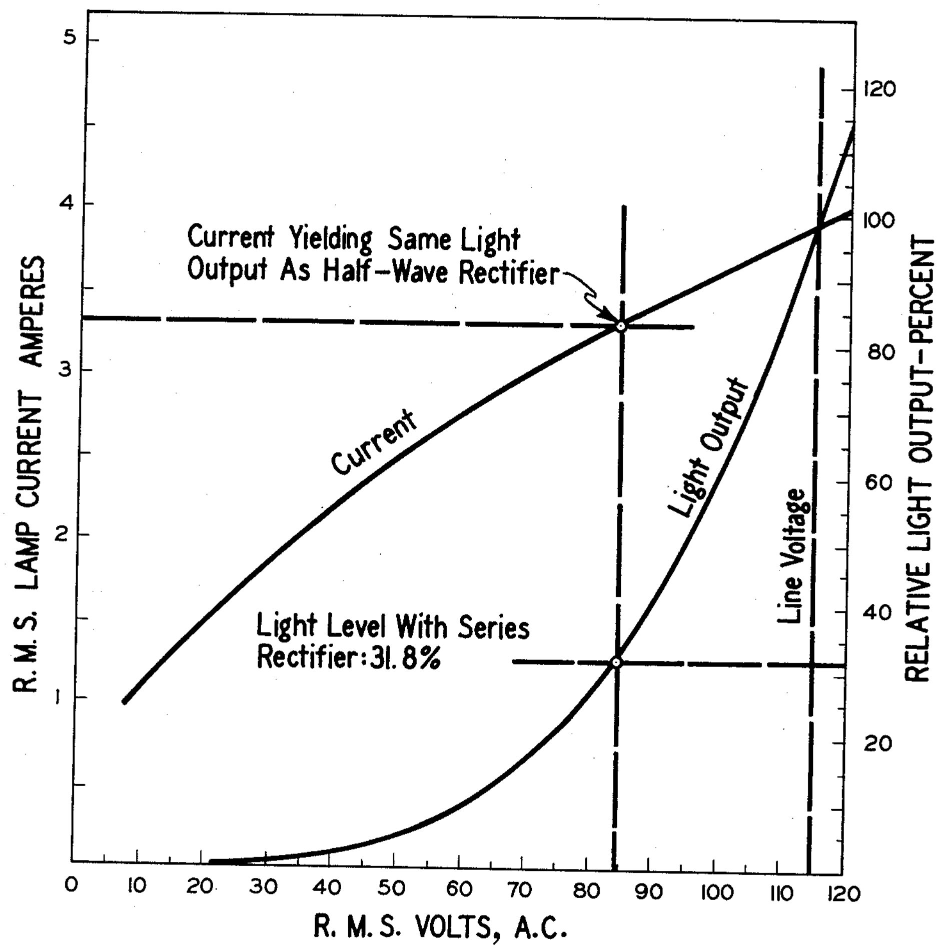
FIG. 16 illustrates a series of curves showing the effect of varying the root mean square (R.M.S.) lamp voltage on lamp current and light output.

The same effective illumination as that available with a series rectifier can be obtained with a series resistance, as shown in FIG. 14, and gives the wave form shown on FIG. 15. The effect of varying the root mean square (R.M.S.) lamp voltage on lamp current and light output is shown in FIG. 16 for an RFL 2A photoflood lamp. These curves indicated that at 31.8 percent relative light output, the R.M.S. current is 3.3 amperes, which is in close agreement with the current when the rectifier is in circuit. The value of a series resistance to yield the desired reduction of light output is 9.2 ohms; and it must be capable of dissipating 100 watts. This is in strong contrast to the use of the rectifier of the invention, which dissipates 3 watts or less in this particular application.

Table I below includes pertinent data relating to various sizes of lamps. In all cases the line voltage was 115 volts, and the peak lamp voltage was 160 volts, which yields an R.M.S. value of about 80 volts or an average value of about 51 volts with the rectifier in series with the lamp. Observation of the lamp voltage waveform on an oscilloscope indicated that the silicon rectifier used was very close to ideal in its characteristics.

TABLE I

| Lamp | | Actual Lamp Current | | Watts Dissipated in Lamp [1] | Light Output [2] | Resistor | |
|---|---|---|---|---|---|---|---|
| Type | Wattage Rating | R.M.S. | Ave. | | | Ohms [3] | Watts |
| Photoflood | 500 | 3.25 | 2.06 | 260 | 31.8 | 9.2 | 100 |
| Do | 375 | 2.75 | 1.75 | 220 | 32.8 | 12.7 | 96.5 |
| Household | 300 | 2.04 | 1.30 | 163 | 29.7 | 17.1 | 71.3 |
| Do | 200 | 1.33 | .85 | 106 | 27.1 | 26.3 | 46.5 |
| Do | 200 | .68 | .43 | 54.5 | 28.2 | 51.5 | 23.8 |

[1] Power dissipated in rectifier 3 watts, or less in all cases.
[2] Values expressed as the percentage of light output obtained when lamp is operated at full rated alternating current voltage.
[3] Resistance required, using the circuit shown in FIG. 14, to produce the same light output level as that of a rectifier-lamp circuit, as shown in FIG. 12, for a given lamp.

From the above data it will be seen that the power dissipated in the series resistor is almost half as much as the power consumed in the lamp. Obviously it would be impractical to install the resistor in the lamp socket or base.

It is apparent from the table that in all cases the use of a series rectifier reduces the light output to about 30 percent of that with full line voltage. A series resistor selected to yield the same reduction in light output must be physically large and adequately ventilated in view of the power it must dissipate with all of the lamp types investigated.

Operating lamps at about 70 percent of rated voltage with the rectifying devices of the invention will, of course, extend their life by a factor of several thousand percent. The color of the lamp at such reduced voltages is more yellow than when operated at full voltage, but this is not objectionable, and even may be advantageous, in particular cases. The warmer light tone is flattering to ladies' complexions, and is generally pleasing.

The present invention requires the use of small size rectifiers. Silicon rectifiers have been found most suitable. With the use of silicon rectifiers, advantages are secured which cannot be had with selenium or copper oxide rectifiers. Thus since a silicon rectifier operates well at temperatures as high as 350° F., the heat from the lamp will not affect its performance, whereas at such a temperature the other rectifiers operate at greatly reduced efficiency if indeed at all.

FIG. 17 is a typical rectifying characteristic for the type of silicon rectifier used herein. After more than 600 hours of operation, the forward voltage drop in the rectifier read 0.88 volt at one ampere, and the reverse current read 5.0 milliamperes at 490 volts. It can be stated, then, that a rectifier of this type is effective in extending the life of photoflood lamps, for the rated life of the RFL 2A photoflood lamp at full line voltage is only six hours.

It should be noted that the rectifier characteristic shown in FIG. 17 shows a reverse performance which is more than twice as efficient as required by the present system.

While the present invention has been described mainly with reference to light dimming, the system of the invention, as stated, is suitable for use with any device which is insensitive to a voltage waveform, such as heating pads and other heat-producing elements where it is desired to have two ranges of heat output. Thus a silicon diode was placed in series with a 47½ watt soldering iron. Temperture readings were taken at regular one minute intervals. Temperature attained with and without the diode are shown in Table II below.

TABLE II

| Time (Minutes) | No Diode, Temp., ° C. | Diode in Series, Temp. ° C. |
|---|---|---|
| 0 | 60 | 60 |
| 1 | 135 | 100 |
| 2 | 230 | 155 |
| 3 | 290 | 190 |
| 4 | 335 | 220 |
| 5 | 370 | 235 |
| 6 | 385 | 250 |
| 7 | 400 | 265 |
| 8 | 410 | 275 |
| 9 | 420 | 280 |
| 10 | 425 | 285 |

What is claimed is:

1. In combination, an incandescent lamp, a lamp socket having a base, and in said base a multiple-position rotary switch having switch-actuated contact points, and a rectifier element having an electrically conductive shell intermediate said lamp, and said socket, in contact with said switch points, but otherwise insulated from said socket, and a silicon diode rectifier contained in said shell in electrical contact therewith, said rectifier element being adapted to pass to said lamp a rectified current through said silicon diode rectifier in one position of said switch and a full wave alternating current through said shell, while bypassing said silicon diode rectifier, in another position of said switch, thereby providing alterante levels of illumination in said lamp.

2. A rectifier element adapted for use in series with a heat-producing electrical device insensitive to voltage wave form, comprising a housing having insulated side walls, conductive top and bottom members fitting in said side walls, electrically conductive means in contact between said top and bottom members, a silicon diode rectifier in contact with said bottom member, contact means passing through said bottom member, means insulating said contact means from said member, and resilient means secured to said contact means for securing said silicon diode rectifier onto said bottom member.

3. A rectifier element adapted for use in series connection with a heat-producing electrical device insensitive to voltage wave form, comprising a housing of a size such as to fit in a standard three-way socket having insulated side walls of unequal length, a straight conductive top member and an L-shaped conductive bottom member fitting in said side walls forming an L-shaped portion of said housing, said top and bottom members being in electrical contact, a silicon diode rectifier in contact with said bottom member, contact means passing through said bottom member, means insulating said contact means from said top and bottom members, respectively, and means electrically connected to said contact means for securing said silicon diode rectifier onto said bottom member in said L-shaped portion of said housing.

4. A rectifier element adapted for use in series with a heat-producing electrical device insensitive to voltage wave form, comprising an electrically conductive shell having a top and bottom, a silicon diode rectifier in said shell, a housing for said shell having insulated side walls, contact means passing through said bottom of said shell, means insulating said contact means from said shell, and resilient means secured to said contact means for securing said silicon diode rectifier in said shell in electrical contact therewith.

5. In combination, an incandescent lamp, a lamp socket having a base, and in said base a multiple-positioned rotary switch having switch-actuated contact points, and a rectifier element intermediate said lamp and said socket comprising an electrically conductive shell having a top and bottom respectively in contact with said lamp and at least one of said switch points in said socket, a silicon diode rectifier in said shell, a housing for said shell having insulated side walls, contact means passing through said bottom of said shell, said contact means making electrical contact with at least another of said switch points, means insulating said contact means from said shell, and resilient means secured to said contact means for securing said silicon diode rectifier in said shell in electrical contact therewith.

6. A rectifier element adapted for use in series with a heat-producing electrical device insensitive to voltage wave form, comprising a housing having insulated side walls, conductive top and bottom members fitting into said side walls, electrically conductive means in contact between said top and bottom members, a silicon diode rectifier in contact with said top member, contact means passing through said bottom member, means insulating said contact means from said member, and resilient means secured to said contact means for securing said silicon diode rectifier onto said top member.

References Cited in the file of this patent

UNITED STATES PATENTS

| | | |
|---|---|---|
| 2,431,151 | Tellegen | Nov. 18, 1947 |
| 2,505,518 | Benander | Apr. 25, 1950 |
| 2,675,452 | McMahan | Apr. 13, 1954 |
| 2,896,125 | Morton | July 21, 1959 |